US009417816B2

(12) United States Patent
Roberts

(10) Patent No.: US 9,417,816 B2
(45) Date of Patent: Aug. 16, 2016

(54) PARTITIONABLE MEMORY INTERFACES

(71) Applicant: Advanced Micro Devices, Inc., Sunnyvale, CA (US)

(72) Inventor: David A. Roberts, Santa Cruz, CA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 0 days.

(21) Appl. No.: 14/146,618

(22) Filed: Jan. 2, 2014

(65) Prior Publication Data
US 2015/0186075 A1 Jul. 2, 2015

(51) Int. Cl.
*G06F 13/14* (2006.01)
*G06F 13/00* (2006.01)
*G06F 3/06* (2006.01)

(52) U.S. Cl.
CPC .............. *G06F 3/0659* (2013.01); *G06F 3/061* (2013.01); *G06F 3/0673* (2013.01)

(58) Field of Classification Search
CPC ... G06F 2212/205; G11C 7/1015; G11C 8/16
See application file for complete search history.

(56) References Cited

U.S. PATENT DOCUMENTS

| 5,606,520 | A * | 2/1997 | Gove | G06F 12/0284 708/491 |
| 7,949,817 | B1 * | 5/2011 | Sakarda | 710/307 |
| 2003/0110340 | A1 * | 6/2003 | Butler | G06F 13/4226 710/305 |
| 2004/0163019 | A1 * | 8/2004 | Elfering | G06F 11/1008 714/52 |
| 2007/0204190 | A1 * | 8/2007 | Hesse et al. | 714/718 |
| 2010/0161892 | A1 * | 6/2010 | Dama et al. | 711/104 |
| 2011/0066821 | A1 * | 3/2011 | Rijshouwer et al. | 711/165 |
| 2011/0258364 | A1 * | 10/2011 | Leung | 711/103 |

OTHER PUBLICATIONS

Kun Fang et al., "Heterogeneous Mini-Rank: Adaptive, Power-Efficient Memory Architecture", 2010, pp. 21-29, 39th International Conference on Parallel Processing.
JEDEC Solid Technology Association, "High Bandwidth Memory (HBM) DRAM", Oct. 2013, 124 pages, JEDEC Standard No. 235.
J. Thomas Pawlowski, "Hybrid Memory Cube (HMC)", Aug. 4, 2011, 24 pages, Proceedings of Hot Chips 23.
Hybrid Memory Cube Consortium, "Hybrid Memory Cube Specification 1.0", 2013, 122 pages.
Doe Hyun Yoon et al., "The Dynamic Granularity Memory System", Jun. 9-13, 2012, pp. 548-560, 39th Annual International Symposium on Computer Architecture (ISCA).
Hongzhong Zheng et al., "Mini-rank: Adaptive DRAM Architecture for Improving Memory Power Efficiency", Nov. 8-12, 2008, pp. 210-221, 41st IEEE/ACM International Symposium on Microarchitecture.

* cited by examiner

*Primary Examiner* — Hyun Nam
(74) *Attorney, Agent, or Firm* — Park, Vaughan, Fleming & Dowler LLP

(57) ABSTRACT

A memory device receives a plurality of read commands and/or write commands in parallel. The memory device transmits data corresponding to respective read commands on respective portions of a data bus and receives data corresponding to respective write commands on respective portions of the data bus. The memory device includes I/O logic to receive the plurality of read commands in parallel, to transmit the data corresponding to the respective read commands on respective portions of the data bus, and to receive the data corresponding to the respective write commands on respective portions of the data bus.

18 Claims, 7 Drawing Sheets

Encodings 200 for Commands on C/A Bus 110, Including Row-Access Commands

| Command | Clock Edge | R[0] | R[1] | R[2] | R[3] | R[4] | R[5] | R[6] |
|---|---|---|---|---|---|---|---|---|
| Row NOP | Rising | H | H | H | V | V | V | V |
|  | Falling | V | V | PAR | V | V | V | V |
| Activate | Rising | L | H | RA15 | BA0 | BA1 | BA2 | V |
|  | Falling | RA11 | RA12 | PAR | RA13 | RA14 | BA3 | V |
|  | Rising | RA5 | RA6 | RA7 | RA8 | RA9 | RA10 | V |
|  | Falling | RA0 | RA1 | PAR | RA2 | RA3 | RA4 | V |
| Precharge | Rising | H | H | L | BA0 | BA1 | BA2 | V |
|  | Falling | V | V | PAR | V | L | BA3 | V |
| Precharge All Banks | Rising | H | H | L | V | V | V | V |
|  | Falling | V | V | PAR | V | H | V | V |
| Single-Bank Refresh | Rising | L | L | H | BA0 | BA1 | BA2 | V |
|  | Falling | V | V | PAR | V | L | BA3 | V |
| Refresh All Banks | Rising | L | L | H | V | H | V | V |
|  | Falling | V | V | PAR | V | H | V | V |
| Power-Down Entry | Rising | H | H | H | V | V | V | V |
|  | Falling | V | V | PAR | V | V | V | V |
| Self-Refresh Entry | Rising | L | L | H | V | V | V | V |
|  | Falling | V | V | PAR | V | V | V | V |
| Power-Down & Self-Refresh Exit | Rising | H | H | H | V | V | V | V |
|  | Falling | V | V | V | V | V | V | V |

FIG. 2

Encodings 300 for Commands on C/A Bus 112, Including Column-Access Commands

| Command | Clock Edge | C[0] | C[1] | C[2] | C[3] | C[4] | C[5] | C[6] | C[7] |
|---|---|---|---|---|---|---|---|---|---|
| Column NOP | Rising | H | H | H | V | V | V | V | V |
|  | Falling | V | V | PAR | V | V | V | V | V |
| Read | Rising | H | H | L | MODE | BA0a | BA1a | BA2a | BA3a |
|  | Falling | CA0a | CA1a | PAR | CA2a | CA3a | CA4a | CA5a | CA6a |
| Read & Auto-Precharge | Rising | H | L | H | MODE | BA0a | BA1a | BA2a | BA3a |
|  | Falling | CA0a | CA1a | PAR | CA2a | CA3a | CA4a | CA5a | CA6a |
| Write | Rising | H | L | L | MODE | BA0a | BA1a | BA2a | BA3a |
|  | Falling | CA0a | CA1a | PAR | CA2a | CA3a | CA4a | CA5a | CA6a |
| Write & Auto-Precharge | Rising | L | H | H | MODE | BA0a | BA1a | BA2a | BA3a |
|  | Falling | CA0a | CA1a | PAR | CA2a | CA3a | CA4a | CA5a | CA6a |
| Set Mode Register | Rising | L | H | L | OP7 | BA0 | BA1 | BA2 | BA3 |
|  | Falling | OP0 | OP1 | PAR | OP2 | OP3 | OP4 | OP5 | OP6 |
| CNOPS | Rising | L | L | H | V | V | V | V | V |
|  | Falling | V | V | PAR | V | V | V | V | V |

FIG. 3

| Command | Clock Edge | R[0] | R[1] | R[2] | R[3] | R[4] | R[5] | R[6] |
|---|---|---|---|---|---|---|---|---|
| Read | Rising | H | H | CA6b | BA0b | BA1b | BA2b | BA3b |
| | Falling | CA0b | CA1b | PAR | CA2b | CA3b | CA4b | CA5b |
| Read & Auto-Precharge | Rising | H | L | CA6b | BA0b | BA1b | BA2b | BA3b |
| | Falling | CA0b | CA1b | PAR | CA2b | CA3b | CA4b | CA5b |
| Write | Rising | L | H | CA6b | BA0b | BA1b | BA2b | BA3b |
| | Falling | CA0b | CA1b | PAR | CA2b | CA3b | CA4b | CA5b |
| Write & Auto-Precharge | Rising | L | L | CA6b | BA0b | BA1b | BA2b | BA3b |
| | Falling | CA0b | CA1b | PAR | CA2b | CA3b | CA4b | CA5b |

Encodings 400 for Column-Access Commands on C/A Bus 110

FIG. 4A

| Command | Clock Edge | R[0] | R[1] | R[2] | R[3] | R[4] | R[5] | R[6] | R[7] |
|---|---|---|---|---|---|---|---|---|---|
| Read | Rising | H | H | CA6b | BA0b | BA1b | BA2b | BA3b | CA7b |
| | Falling | CA0b | CA1b | PAR | CA2b | CA3b | CA4b | CA5b | CA7a |
| Read & Auto-Precharge | Rising | H | L | CA6b | BA0b | BA1b | BA2b | BA3b | CA7b |
| | Falling | CA0b | CA1b | PAR | CA2b | CA3b | CA4b | CA5b | CA7a |
| Write | Rising | L | H | CA6b | BA0b | BA1b | BA2b | BA3b | CA7b |
| | Falling | CA0b | CA1b | PAR | CA2b | CA3b | CA4b | CA5b | CA7a |
| Write & Auto-Precharge | Rising | L | L | CA6b | BA0b | BA1b | BA2b | BA3b | CA7b |
| | Falling | CA0b | CA1b | PAR | CA2b | CA3b | CA4b | CA5b | CA7a |

Encodings 450 for Column-Access Commands on C/A Bus 110

FIG. 4B

PARTITIONABLE MEMORY INTERFACES

STATEMENT OF GOVERNMENT INTEREST

This invention was made with Government support under Prime Contract Number DE-AC52-07NA27344, Subcontract Number B600716 awarded by DOE. The Government has certain rights in this invention.

TECHNICAL FIELD

The present embodiments relate generally to memory devices and interfaces, and more specifically to partitioning memory interfaces.

BACKGROUND

Data for operations to be performed in a computer system or other electronic system may be fetched from a memory device in blocks. For example, memory interface standards may specify a minimum read/write transaction size. This transaction size, however, may exceed the desired amount of data, resulting in over-fetching, which wastes power and bandwidth. This problem is exacerbated as data bus widths increase.

SUMMARY

In some embodiments, a method is performed in a memory device. The method includes receiving a plurality of read commands and/or write commands in parallel. Data corresponding to respective read commands are transmitted on respective portions of a data bus. Data corresponding to respective write commands are received on respective portions of the data bus.

In some embodiments, a memory device includes input/output (I/O) logic to receive a plurality of read commands and/or write commands in parallel. The I/O logic transmits data corresponding to respective read commands on respective portions of a data bus and receives data corresponding to respective write commands on respective portions of the data bus.

Multiple memory transactions thus may be performed in parallel in a memory device. Furthermore, the size of each transaction may be reduced as compared to the size of memory transactions performed serially. Reducing the transaction size reduces over-fetching of unneeded data, thereby saving power and bandwidth.

BRIEF DESCRIPTION OF THE DRAWINGS

The present embodiments are illustrated by way of example and are not intended to be limited by the figures of the accompanying drawings.

FIG. 2 is a table showing encodings for commands, including row-access commands, provided to a memory device on a first command-and-address bus in accordance with some embodiments.

FIG. 3 is a table showing encodings for commands, including column-access commands, provided to a memory device on a second command-and-address bus in accordance with some embodiments.

FIGS. 4A and 4B are tables showing encodings for column-access commands provided to a memory device on the first command-and-address bus in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
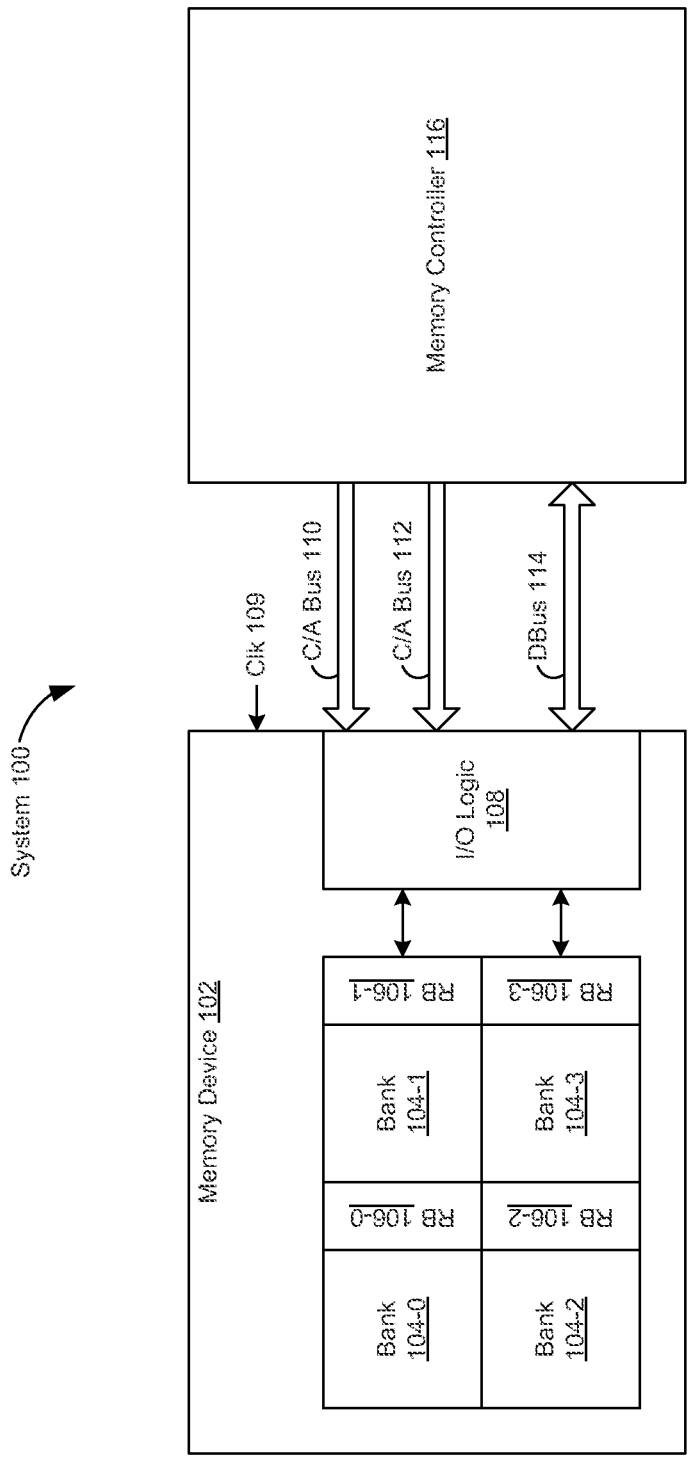
FIG. 1 is a block diagram of a system in which a memory device is coupled to a memory controller in accordance with some embodiments.

FIG. 1 is a block diagram of a system 100 in which a memory device 102 is coupled to a memory controller 116 in accordance with some embodiments. In some embodiments, the memory device 102 is a dynamic random-access memory (DRAM). Alternatively, the memory device 102 may be another type of memory (e.g., a phase-change memory, resistive random-access memory, or other type of memory). In some embodiments, the memory device 102 is a single integrated circuit. In some other embodiments, the memory device 102 includes a plurality of integrated circuits in a single package (e.g., in a stacked configuration). The memory controller 116 may be coupled to one or more processors (e.g., central processing units, graphics processing units, digital signal processors, etc.) and may issue commands to the memory device 102 in accordance with instructions performed by the one or more processors.

The memory device 102 includes an array of memory cells divided into a plurality of banks 104. In the example of FIG. 1, the memory device 102 includes four banks 104-0 through 104-3. However, the number of banks 104 may vary. Each bank 104 includes a sub-array of memory cells arranged in rows and columns, which are not shown in FIG. 1 for simplicity. In the example of FIG. 1, the rows run vertically in each of the banks 104-0 through 104-3 and the columns run horizontally in each of the banks 104-0 through 104-3. The memory device 102 thus includes a plurality of memory locations, each of which is addressed by a distinct combination of a bank address, a row address, and a column address. Each memory location includes a plurality of memory cells that stores a block of data.

Each of the banks 104 is coupled to a corresponding row buffer 106: bank 104-0 is coupled to a row buffer 106-0, bank 104-1 is coupled to a row buffer 106-1, bank 104-2 is coupled to a row buffer 106-2, and bank 104-3 is coupled to a row buffer 106-3. When a row in a bank 104 is activated, the data stored in the memory cells of the row are transferred to the respective row buffer 106. Portions of the data for the row may subsequently be read from the respective row buffer 106 (e.g., in bursts) in accordance with subsequent read commands. Each read command specifies a column address, which specifies the portion of data to be read from the respective row buffer 106.

The memory device 102 is coupled with the memory controller 116 through a first command-and-address (C/A) bus 110, a second C/A bus 112, and a data bus (DBus) 114. Each of the busses 110, 112, and 114 includes a plurality of signal lines. (Additional signal lines, such as signal lines for various control signals and/or enable signals, may also couple the memory device 102 with the memory controller 116.) The memory controller 116 sends commands to the memory device 102 over the first and second C/A busses 110 and 112. Examples of these commands are described below with respect to FIGS. 2, 3, 4A, and 4B. For write commands, the memory controller 116 sends data to the memory device 102 through the data bus 114 (e.g., in a burst of data bus cycles). The memory device 102 writes the data to memory locations specified by addresses received through the first C/A bus 110 and/or second C/A bus 112. For read commands, the memory device 102 accesses data stored at memory locations specified by addresses received through the first C/A bus 110 and/or second C/A bus 112. The memory device 102 transmits the accessed data to the memory controller 116 through the data bus 114 (e.g., in a burst of data bus cycles).

In some embodiments, commands sent from the memory controller 116 to the memory device 102 include row-access commands (e.g., including activate commands that specify rows to be activated) and column-access commands (e.g., including read commands and write commands). Row-access commands may be sent from the memory controller 116 to the memory device 102 on the first C/A bus 110, while column-access commands may be sent from the memory controller 116 to the memory device 102 on the second C/A bus 112. However, the frequency of row-access commands may be less than the frequency of column-access commands, because multiple column accesses may be performed in a single row. As a result, there may be unused bandwidth on the first C/A bus 110. The memory controller 116 may use this otherwise unused bandwidth to transmit additional column-access commands (e.g., additional read commands and/or write commands) to the memory device 102. The memory controller 116 thus may transmit two or more commands (e.g., read and/or write commands) to the memory device 102 in parallel on the first and second C/A busses 110 and 112, such that the two commands are provided simultaneously (e.g., in the same clock cycle or set of clock cycles). In some embodiments, a first command and a first portion of a second command are provided on the first C/A bus 110, while a second portion of the second command is provided in parallel on the second C/A bus 112 (or vice-versa). In some other embodiments, the first command is provided on the first C/A bus 110 and the second command is provided in parallel on the second C/A bus 112.

The data bus 114 may be partitioned into multiple portions (i.e., multiple sub-channels), with each portion used for a respective command of a plurality of commands provided in parallel to the memory device 102. For example, if two commands are provided in parallel to the memory device 102, the data bus 114 may be partitioned into a first portion (e.g., a first half) used for data associated with the first command and a second portion (e.g., a second half) used for data associated with the second command. Each portion of the data bus 114 is thus used for a distinct memory transaction. In some embodiments, the number of portions into which the data bus 114 is partitioned is specified by a control signal that the memory controller 116 provides to the memory device 102. The partitioning of the data bus 114 therefore may be reconfigured on the fly during operation in accordance with some embodiments.

In some embodiments, the data bus 114 is partitioned into multiple portions in a first mode of operation but not in a second mode of operation. In the first mode, the memory controller 116 may provide multiple commands (e.g., multiple read and/or write commands) to the memory device 102 in parallel, with each portion of the data bus 114 being used to convey data associated with a respective command. In the second mode, the memory controller 116 provides commands to the memory device 102 in series, such that only a single command is provided to the memory device 102 at a time. In the second mode, the entire data bus is used to convey data associated with a respective command. Furthermore, in some embodiments the memory device 102 and memory controller 116 may operate in one or more additional modes, with the data bus 114 being partitioned into a different number of portions in each additional mode.

The memory device 102 includes I/O logic 108 that is coupled to the row buffers 106 and to the C/A bus 110, C/A bus 112, and data bus 114. For read operations, the I/O logic 108 receives data from the row buffers 106 and transmits the data on the data bus 114. For parallel read commands in the first mode, the I/O logic 108 provides data from the row buffers 106 to the corresponding portions of the data bus 114. For read commands in the second mode, the I/O logic 108 provides data from the row buffers 106 to the entire data bus 114. For parallel write commands in the first mode, the I/O logic 108 provides data from corresponding portions of the data bus 114 to respective memory locations. For write commands in the second mode, the I/O logic 108 provides data from the entire data bus 114 to respective memory locations.

In some embodiments, the memory device 102 operates in accordance with a received clock signal 109. For example, the memory device 102 samples the C/A bus 110 and C/A bus 112, and samples or transmits on the data bus 114, on rising and/or falling edges of the clock signal 109. Each of the C/A bus 110, C/A bus 112, and data bus 114 may be a double-data-rate (DDR) bus or a single-data-rate (SDR) bus. If the data bus 114 is a DDR bus, lengths of bursts are measured in clock edges, including both rising and falling clock edges. If the data bus 114 is an SDR bus, lengths of bursts are measured in rising clock edges, and therefore in clock cycles.

In one example, the data bus 114 is a DDR bus with a width of 128, such that 16 bytes (16B) are transferred on each clock edge, and memory transactions (e.g., reads and writes) have a burst length of two. The data bus 114 thus transfers 32B in a single-clock-cycle burst of burst length 2, with 16B transferred on the rising edge of the clock signal 109 and 16B transferred on the falling edge of the clock signal 109. In the second mode, a sequence of individual, successive 32B memory transactions is performed. In the first mode, two 16B memory transactions may be performed in parallel. (Alternatively, the burst length in the first mode may be increased to four, such that two 32B memory transactions may be performed in parallel.) In general, however, different embodiments may have different bus widths, burst lengths, and transaction sizes.

FIG. 2 is a table showing encodings 200 for commands provided from the memory controller 116 to the memory device 102 on the first C/A bus 110 in accordance with some embodiments. In the example of FIG. 2, the first C/A bus 110 has a seven-bit width; the bits (and corresponding signal lines) are labeled R[0] through R[6]. Also in the example of FIG. 2, the first C/A bus 110 is DDR, such that bits are conveyed on both the rising edge and falling edge of the clock signal 109. (The clock edges are specified in the "clock edge" column). In FIG. 2 (and FIGS. 3, 4A, and 4B), 'H' indicates that a bit is logic-high (e.g., '1'), 'L' indicates that a bit is logic-low (e.g., '0'), and 'V' indicates a don't-care status for a bit value.

The commands listed in FIG. 2 include a row no-operation (NOP) command, activate command, precharge command, precharge all banks command, single-bank refresh command, refresh all banks command, power-down entry command, self-refresh entry command, and power-down and self-refresh exit command. Each of these commands includes command bits; the activate, precharge and single-bank refresh commands also include address bits. The commands may also include a parity bit (PAR) used to detect errors in the command bits and/or address bits.

The row NOP command tells the memory device 102 to perform no row-related operation. The command bits for the row NOP command are the 'H' bits on R[0], R[1], and R[2] for the rising clock edge of a clock cycle.

The activate command tells the memory device 102 to activate a row (e.g., to turn on a word-line for a row) at an address specified by bank address bits BA3, BA2, BA1, and BA0 (i.e., BA[3:0]) and row address bits RA[15:0]. (The memory device 102 therefore has 16 banks 104 addressed by four bank address bits in this example.) The command bits for the activate command are the respective 'L' and 'H' bits on R[0] and R[1] for the first rising clock edge. The activate command extends across four clock edges in two successive clock cycles, whereas the other commands in FIG. 2 are transmitted in a single clock cycle. Activation of the row causes the data in the row to be transferred to a corresponding row buffer 106. The activate command is thus a row-access command.

The precharge command tells the memory device 102 to precharge the bit lines in a bank 104 specified by bank address bits BA[3:0]. The precharge all banks command tells the memory device 102 to precharge the bit lines in all of the banks 104. The command bits for these commands are on R[0], R[1], and R[2] for the rising clock edge and R[4] for the falling clock edge.

The single-bank refresh command tells the memory device 102 to refresh the data stored in the memory cells of a bank 104 specified by bank address bits BA[3:0]. The refresh all banks command tells the memory device 102 to refresh the data stored in the memory cells of all of the banks 104. The command bits for these commands are on R[0], R[1], and R[2] for the rising clock edge and R[4] for the falling clock edge.

The power-down entry command tells the memory device 102 to enter a low-power mode. The self-refresh entry command tells the memory device 102 to enter a mode in which it performs self-refresh of stored data. The power-down and self-refresh exit command tells the memory device 102 to exit the low-power mode and/or the self-refresh mode. The command bits for these commands are on R[0], R[1], and R[2] for the rising clock edge.

FIG. 3 is a table showing encodings 300 for commands provided from the memory controller 116 to the memory device 102 on the second C/A bus 112 in accordance with some embodiments. In the example of FIG. 3, the second C/A bus 112 has an eight-bit width; the bits (and corresponding signal lines) are labeled C[0] through C[7]. Also in the example of FIG. 3, the second C/A bus 112 is DDR, such that bits are conveyed on both the rising edge and falling edge of the clock signal 109. (The clock edges are specified in the "clock edge" column).

The commands listed in FIG. 3 include a column NOP command, read command, read-with-automatic-precharge command, write command, write-with-automatic-precharge command, set mode register command, and split column NOP (CNOPS) command. As in FIG. 2, each of these commands includes command bits and a parity bit. The read command, read-with-automatic-precharge command, write command, and write-with-automatic-precharge command also include address bits and a mode bit. The read command, read-with-automatic-precharge command, write command, and write-with-automatic-precharge command are examples of column-access commands. While the read-with-automatic-precharge command is listed separately from the read command, it is a type of read command. Similarly, while the write-with-automatic-precharge command is listed separately from the write command, it is a type of write command.

The column NOP command tells the memory device 102 to perform no column-related operation. The command bits for the column NOP command are the 'H' bits on C[0], C[1], and C[2] for the rising clock edge of a clock cycle.

The read and read-with-automatic-precharge commands each tell the memory device 102 to perform a read operation for a column specified by column address bits CA0a through CA6a (i.e., CA[6:0]a) in a bank 104 specified by bank address bits BA3a, BA2a, BA1a, and BA0a (i.e., BA[3:0]a). The read-with-automatic-precharge command also tells the memory device 102 to precharge the bit lines in the specified bank 104 after performing the read operation. (In some embodiments, one or more additional address bits for a read command may be provided on the first C/A bus 110, for example in the first mode. An example in which an eighth column address bit CA7a is provided on the first C/A bus 110 is described below with respect to FIG. 4B.) Data in the specified column of the specified bank 104 is read from the row buffer 106 corresponding to the specified bank 104. The command bits for the read and read-with-automatic-precharge commands are on C[0], C[1], and C[2] for the rising clock edge in a clock cycle. The data accessed in response to the read commands is transmitted on a first portion (e.g., a first half) of the data bus 114 in the first mode and on the entire data bus 114 (e.g., on all signal lines of the data bus 114) in the second mode.

The write and write-with-automatic-precharge commands each tell the memory device 102 to perform a write operation for a column specified by column address bits CA0a through CA6a (i.e., CA[6:0]a) in a bank 104 specified by bank address bits BA3a, BA2a, BA1a, and BA0a (i.e., BA[3:0]a). The write-with-automatic-precharge command also tells the memory device 102 to precharge the bit lines in the specified bank 104 after performing the write operation. (In some embodiments, one or more additional address bits for a write command may be provided on the first C/A bus 110, for example in the first mode. An example in which an eighth column address bit CA7a is provided on the first C/A bus 110 is described below with respect to FIG. 4B.) The row in which the write is to be performed is specified by a previous activate command. The command bits for the write and write-with-automatic-precharge commands are on C[0], C[1], and C[2] for the rising clock edge in a clock cycle. The data for the write commands is provided on a first portion (e.g., a first half) of the data bus 114 in the first mode and on the entire data bus 114 (e.g., on all signal lines of the data bus 114) in the second mode.

The mode bit in the read command, read-with-automatic-precharge command, write command, and write-with-automatic-precharge command selects between the first and second modes. The memory device 102 enters the first mode in response to receiving a mode bit having a first value (e.g., 'H', or alternately 'L') and enters the second mode in response to receiving a mode bit having a second value (e.g., 'L', or alternately 'H'). In the example of FIG. 3, the mode bit is on C[3] for the rising clock edge in a clock cycle.

The set mode register command tells the memory device 102 to set a mode register for a specified bank in accordance with an opcode specified by opcode bits OP[7:0]. The command bits for the set mode register command are on C[0], C[1], and C[2] for the rising clock edge in a clock cycle.

The split column NOP (CNOPS) command is used in the first mode, for example, and instructs the memory device 102 to perform no column access (e.g., no read or write operation) associated with a respective portion (e.g., half) of the data bus 114. The memory device 102 may, however, perform a column access (e.g., a read or write operation) associated with another portion (e.g., the other half) of the data bus 114, in response to a column-access command received on the first C/A bus 110 (e.g., as described below with respect to FIG. 4A or 4B). The command bits for the split column NOP command are on C[0], C[1], and C[2] for the rising clock edge in a clock cycle. In some embodiments, the CNOPS command also includes the mode bit (e.g., on C[3] on the falling clock edge in a clock cycle). Alternatively, the mode bit is omitted and the CNOPS command is uniquely identified by the command bits, as shown in FIG. 3.

FIG. 4A is a table showing encodings 400 for column-access commands provided from the memory controller 116 to the memory device 102 on the first C/A bus 110 in accordance with some embodiments. The column-access commands of FIG. 4A may be provided to the memory device 102 in clock cycles in which the first C/A bus 110 is not used to provide any of the commands of FIG. 2 to the memory device 102. In some embodiments, the column-access commands of FIG. 4A are provided to the memory device in the first mode (e.g., when a mode bit on the second C/A bus 112 has a first value) and not in the second mode (when a mode bit on the second C/A bus 112 has a second value). The column-access commands of FIG. 4A may be provided to the memory device 102 in parallel with (e.g., in the same clock cycle as) the column-access commands of FIG. 3.

The column-access commands of FIG. 4A include read, read with automatic precharge, write, and write with automatic precharge, which function by analogy to the corresponding commands of FIG. 3, but are associated with only a respective portion (e.g., a respective half) of the data bus 114. The data accessed in response to the read commands is transmitted on this portion of the data bus 114. The data for the write commands is provided on this portion of the data bus 114. The command bits for the column-access commands are on R[0] and R[1] for the rising clock edge of a clock cycle. The bank and column address bits are situated as shown in FIG. 4A. The bank addresses BA[3:0]b are independent of the bank addresses BA[3:0]a of FIG. 3. Likewise, the column addresses CA[6:0]b are independent of the column addresses CA[3:0]a of FIG. 3. The row for which a respective column-access command is performed is specified in a previous activate command provided over the first C/A bus 110 (e.g., as shown in FIG. 2).

In the example of FIGS. 3 and 4A, the number of column address bits is the same in the first and second modes, which indicates that the amount of data associated with a memory transaction (e.g., a given read or write command), and thus the size of a memory transaction, is the same regardless of the mode. However, only a portion of the data bus 114 is used for a given memory transaction in the first mode, while the entire data bus 114 is used for a given memory transaction in the second mode. To accommodate this difference, the burst length in the first mode is longer than (e.g., twice as long as) the burst length in the second mode. For example, the burst length may be two in the second mode and four in the first mode.

Alternatively, the amount of data associated with memory transactions in the first mode is less than the amount of data associated with memory transaction in the second mode. The granularity of memory transactions in the first mode thus is greater than the granularity of memory transactions in the second mode. In some embodiments, to accommodate this increased granularity, the number of column address bits is increased in the first mode as compared to the second mode. For example, one extra column address bit is added in the first mode, in which case the size of memory transactions in the first mode is half the size of memory transactions in the second mode (e.g., 16B versus 32B). Burst size thus may remain unchanged with respect to the second mode. Reducing the size of memory transactions reduces or eliminates over-fetching of unneeded data from the memory device 102, thereby saving bandwidth and reducing power.

FIG. 4B is a table showing encodings 450 for column-access commands on the first C/A bus 110 in accordance with some embodiments. In FIG. 4B, an additional column address bit has been added to the column-access commands of FIG. 4A and also to the column-access commands of FIG. 3. The width of the C/A bus 110 is increased by one bit, such that the C/A bus 110 now includes bit R[7] and therefore is eight bits wide. Address bit CA7b, which is on R[7] for the rising clock edge of a clock cycle, is an additional column address bit (e.g., the most significant column address bit) for the column access commands provided on the first C/A bus 110. Address bit CA7a, which is on R[7] for the falling clock edge of a clock cycle, is an additional column address bit (e.g., the most significant column address bit) for the column-access commands otherwise provided on the second C/A bus 112.

As FIG. 4B illustrates, a first portion of a command may be provided on the first C/A bus 110 and a second portion of a command may be provided on the second C/A bus 112. Alternatively, a command may be provided entirely on one of the C/A busses 110 and 112.

The width of the first C/A bus 110 and/or second C/A bus 112 and/or the number of C/A busses may be increased to accommodate partitioning of the data bus 114 into more than two portions. Also, the first C/A bus 110 and/or second C/A bus 112 may be over-clocked with respect to the data bus 114 to accommodate partitioning of the data bus 114 into more than two portions.

The command bit values, command bit locations, and address bit locations in FIGS. 2, 3, 4A, and 4B are merely examples and may vary. While FIGS. 2, 3, 4A, and 4B show DDR embodiments, the first C/A bus 110 and second C/A bus 112 may alternately be SDR, with bits being provided on successive rising edges of the clock signal 109.

Figure 5A:
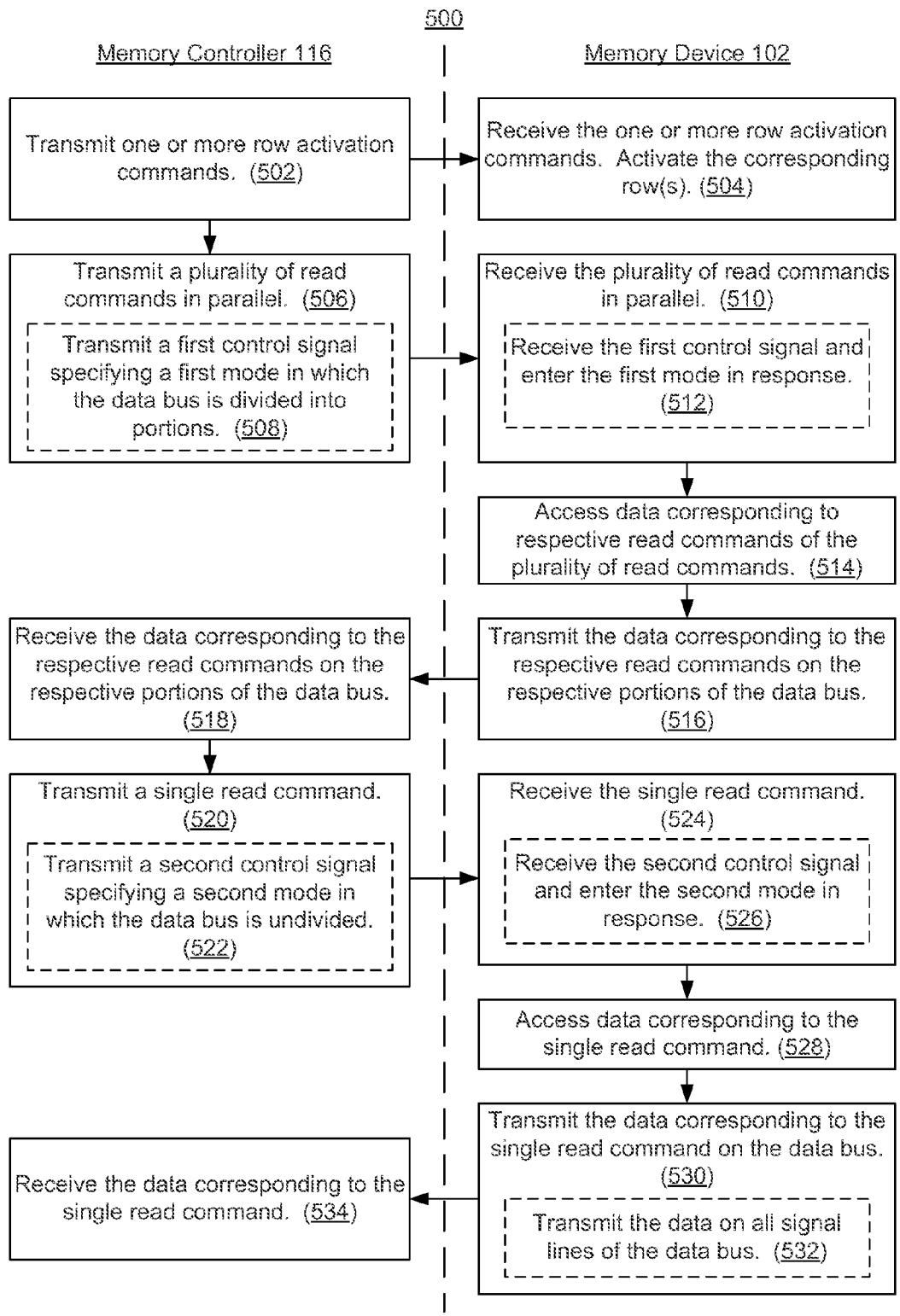
FIGS. 5A and 5B are flowcharts showing methods of operating a memory controller and memory device in accordance with some embodiments.

FIG. 5A is a flowchart showing a method 500 of operating the memory controller 116 and memory device 102 in accordance with some embodiments. The memory controller 116 transmits (502) one or more row activation commands (e.g., activate commands as shown in FIG. 2) to the memory device 102. The memory device 102 receives (504) the one or more row activation commands and activates the corresponding row(s). Data in the corresponding row(s) is transferred into the corresponding row buffer(s) 106.

The memory controller 116 transmits (506) a plurality of read commands in parallel (e.g., in a first set of one or more clock cycles) to the memory device 102. The memory device 102 receives (510) the plurality of read commands in parallel.

For example, first and second read commands are sent to the memory device 102 in parallel on the first C/A bus 110 and second C/A bus 112, as described with respect to FIGS. 3 and 4A or FIGS. 3 and 4B. Command bits for the first read command thus may be received on the first C/A bus 110, while command bits for the second read command may be received on the second C/A bus 112. At least a portion of the address bits for the first read command may be received on the first C/A bus 110 and at least a portion of the address bits for the second read command may be received on the second C/A bus 112. In some embodiments, the address bits (e.g., CA[7:0]b) for the first read command are received on the first C/A bus 110, a first portion of the address bits (e.g., CA[6:0]a) for the second read command are received on the second C/A bus 112, and a second portion of the address bits (e.g., CA7a) for the second read command are received on the first C/A bus 110. In some embodiments, the command bits for the first and second read commands are received on the rising clock edge in a clock cycle, while address bits for the first and second read commands are received on both the rising and falling clock edges in the clock cycle. Other examples are possible.

In some embodiments, the memory controller 116 transmits (508) to the memory device 102 a first control signal (e.g., the mode bit of FIG. 3) specifying a first mode in which the data bus 114 is divided, and thus partitioned, into portions. The memory device 102 receives (512) the first control signal and enters the first mode in response.

The memory device 102 accesses (514) data corresponding to respective read commands of the plurality of read commands. For example, the data is provided from one or more row buffers 106 to the I/O logic 108.

The memory device 102 transmits (516) the data corresponding to the respective read commands on the respective portions of the data bus 114. The memory controller 116 receives (518) this data. In some embodiments, the data is transmitted in parallel bursts, with each burst corresponding to a respective read command of the plurality of read commands. For example, data corresponding to a first read command is transmitted in a burst on a first portion (e.g., first half) of the data bus 114 while data corresponding to a second read command is transmitted in a burst on a second portion (e.g., second half) of the data bus 114.

The memory controller 116 transmits a single read command (e.g., in a second set of one or more clock cycles distinct from the first set of one or more clock cycles), which the memory device 102 receives (524). The single read command may be preceded by another row activation command. The single read command is transmitted, for example, as shown in FIG. 3, 4A, or 4B.

The memory device 102 accesses (528) data corresponding to the single read command. For example, the data is provided from a row buffer 106 to the I/O logic 108. The memory device 102 transmits (530) the data corresponding to the single read command on the data bus 114. The memory controller 116 receives (534) this data.

In some embodiments, the memory controller 116 transmits (522) a second control signal (e.g., the mode bit of FIG. 3) specifying a second mode in which the data bus is undivided. The memory device 102 receives (526) the second control signal and enters the second mode in response. The memory device 102 transmits (532) the data corresponding to the single read command (which was received, for example, on the second C/A bus 112, as shown in FIG. 3) on all signal lines of the data bus 114.

Alternatively, the data corresponding to the single read command (which is received, for example, on the first C/A bus 110, as shown in FIG. 4A) may be transmitted on a first portion (e.g., a first half) of the data bus 114. For example, the memory device 102 receives a column NOP command (e.g., the CNOPS command of FIG. 3) corresponding to a second portion (e.g., a second half) of the data bus 114 in parallel with the single read command (e.g., during the second set of one or more clock cycles). In response to the column NOP command, the memory device 102 does not transmit data on the second portion of the data bus 114 while transmitting the data corresponding to the single read command on the first portion of the data bus 114. For example, the memory device 102 tristates the drivers in the I/O logic 108 for the second portion of the data bus 114.

Figure 5B:
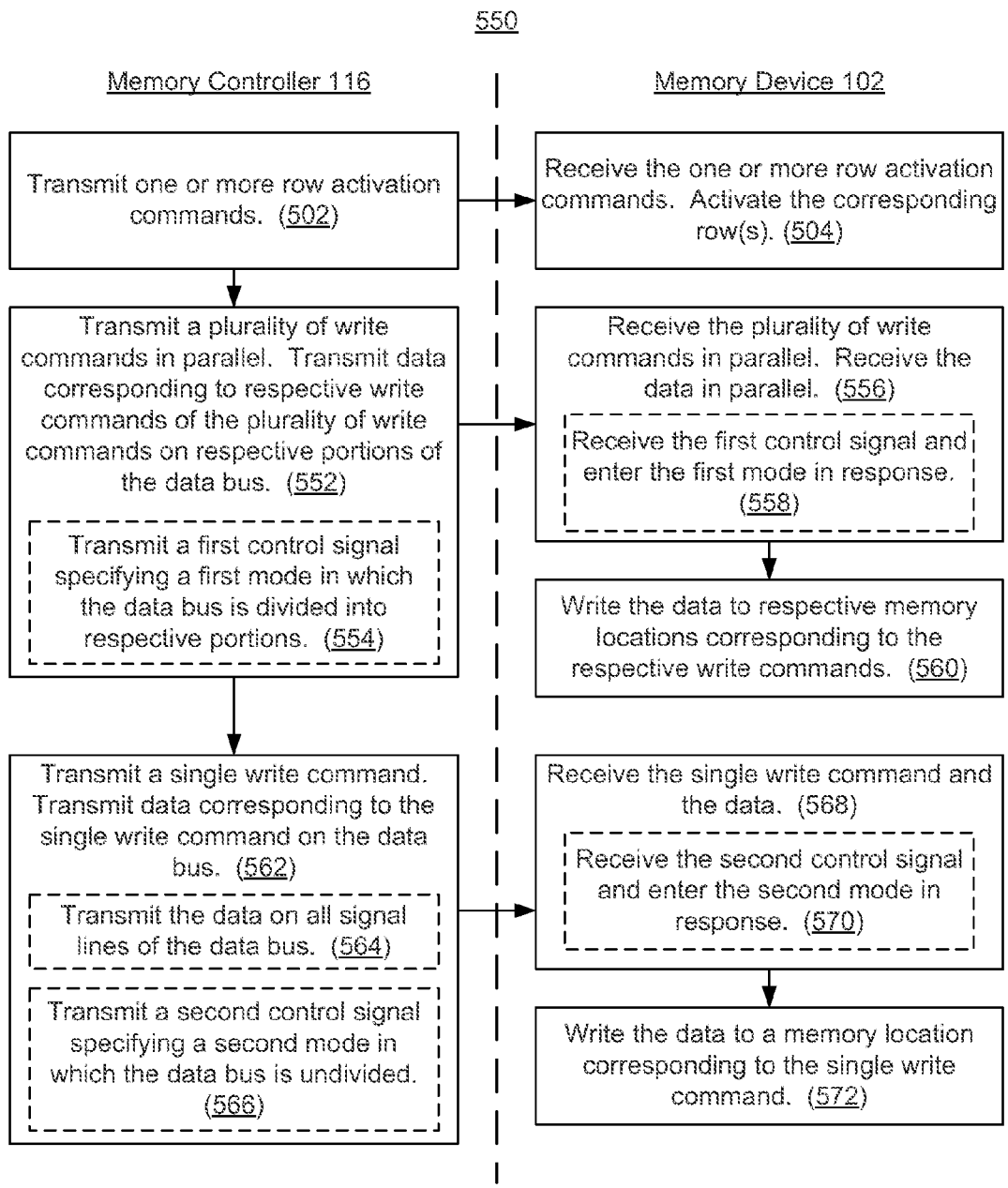

FIG. 5B is a flowchart showing a method 550 of operating the memory controller 116 and memory device 102 in accordance with some embodiments. The method 550 can be combined with the method 500.

The memory controller 116 transmits (502), and the memory device receives (504), one or more row activation commands, as described for the method 500 (FIG. 5A).

The memory controller 116 transmits (552) a plurality of write commands in parallel and transmits data corresponding to respective write commands of the plurality of write commands on respective portions of the data bus. The data corresponding to the respective write commands is transmitted in parallel (e.g., in parallel bursts). The memory device 102 receives (556) the plurality of write commands and the data in parallel.

For example, first and second write commands are sent to the memory device 102 in parallel on the first C/A bus 110 and second C/A bus 112, as described with respect to FIGS. 3 and 4A or FIGS. 3 and 4B.

In some embodiments, the memory controller 116 transmits (554) to the memory device 102 a first control signal (e.g., the mode bit of FIG. 3) specifying a first mode in which the data bus 114 is divided into portions (e.g., as described for operation 508, FIG. 5A). The memory device 102 receives (558) the first control signal and enters the first mode in response.

The memory device 102 writes (560) the data to respective memory locations corresponding to (e.g., specified at least in part by) the respective write commands.

The memory controller 116 transmits (562) a single write command and transmits data corresponding to the single write command on the data bus 114. The single write command is transmitted, for example, as shown in FIG. 3, 4A, or 4B. The memory device 102 receives (568) the single write command and the data, and writes (572) the data to a memory location corresponding to (e.g., specified at least in part by) the single write command.

In some embodiments, the memory controller 116 transmits (564) the data for the single write command on all signal lines of the data bus 114, and thus on the entire data bus 114. For example, the memory controller 116 transmits (566) to the memory device 102 a second control signal specifying a second mode in which the data bus 114 is undivided (e.g., as described for operation 522, FIG. 5A). The memory device 102 receives (570) the second control signal and enters the second mode in response.

Alternatively, the memory controller 116 transmits (564) the data for the single write command on a first portion (e.g., a first half) of the data bus 114. The memory controller 116 transmits a column NOP command (e.g., the CNOPS command of FIG. 3) corresponding to a second portion (e.g., a second half) of the data bus 114.

The methods 500 and 550 may be expanded to include performing a read in parallel with write: the memory controller 116 may provide parallel read and write commands to the memory device 102.

The methods 500 and 550 include a number of operations that appear to occur in a specific order. However, it should be apparent that the methods 500 and 550 can include more or fewer operations, an order of two or more operations may be changed, performance of two or more operations may overlap, and two or more operations may be combined into a single operation.

Figure 6:
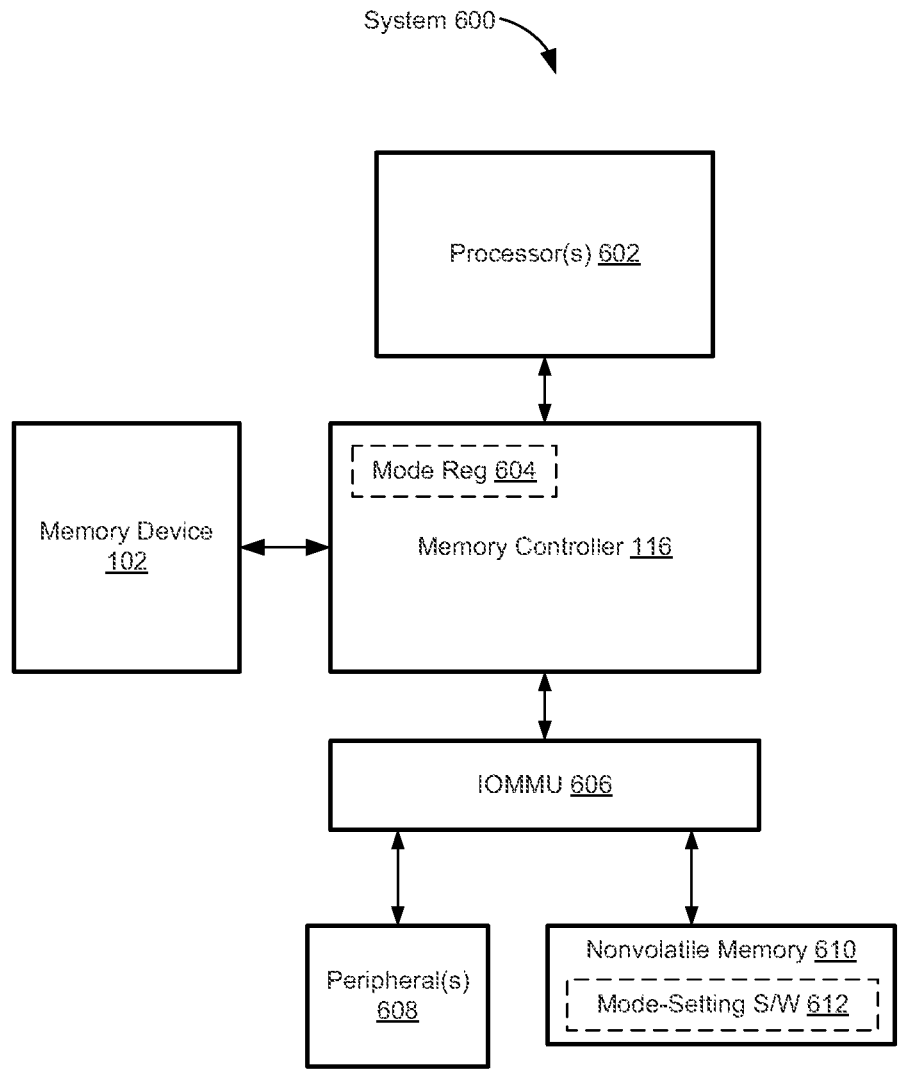
FIG. 6 is a block diagram of a system in which software may specify a mode of operation for a memory device and memory controller in accordance with some embodiments.

In some embodiments, software may specify the mode (e.g., the first mode or second mode) in which the memory controller 116 and memory device 102 operate. FIG. 6 is a block diagram of a system 600 in which software running on one or more processors 602 may specify the mode in accordance with some embodiments. In addition to the one or more processors 602, the system 600 includes the memory device 102 (FIG. 1), the memory controller 116 (FIG. 1), an I/O memory management unit (IOMMU) 606, one or more peripherals 608, and a nonvolatile memory 610. The memory controller 116 couples the one or more processors 602 to the memory device 102, thereby providing the one or more processors 602 with access to the memory device 102. The IOMMU 606 couples the memory controller 116, and thus the one or more processors 600 and the memory device 102, to the one or more peripherals 608 and the nonvolatile memory 610.

The memory controller 116 includes a mode register 604, which is software-accessible. The nonvolatile memory 610 (e.g., a boot ROM, flash memory, hard-disk drive, etc.) includes a non-transitory computer-readable storage medium storing one or more programs with instructions configured for execution by the one or more processors 602. The one or more programs include mode-setting software 612. The mode-setting software 612 includes instructions to specify the mode by storing a value in the mode register 604. For example, the mode-setting software 612 includes instructions to specify the first mode by storing a first value in the mode register 604 and instructions to specify the second mode by storing a second value in the mode register 604. The memory controller 116 thus operates in accordance with the first mode when the first value is stored in the mode register 604 and operates in accordance with the second mode when the second value is stored in the mode register 604. Furthermore, in some embodiments the mode-setting software 612 includes instructions to specify a third mode in which the memory controller 116 selects between the first and second mode on the fly (e.g., based on current states of the busses 110, 112, and/or 114). In the third mode the memory controller 116 thus has discretion to select between the first and second modes for different transactions (e.g., based on whether the busses 110, 112, and/or 114 are busy or free).

In some embodiments, the functionality of the memory controller 116 as described herein is implemented in hardware. Alternatively, the functionality of the memory controller 116 may be implemented in firmware. For example, the memory controller 116 may include a microcontroller. The nonvolatile memory 610 may include a non-transitory computer-readable storage medium storing one or more programs with instructions configured for execution by the microcontroller. These instructions include instructions that, when executed by the microcontroller, cause the memory controller 116 to achieve the functionality described herein. For example, these instructions include instructions that, when executed by the microcontroller, cause the memory controller 116 to perform its portion of the methods 500 and/or 550 (FIGS. 5A-5B).

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method, comprising:
   in a memory device:
   receiving a plurality of read commands in parallel, the receiving comprising receiving a first read command on a first bus and receiving a second read command on a second bus, the first bus separate from the second bus; and
   transmitting data corresponding to respective read commands of the plurality of read commands in parallel on respective portions of a data bus, the transmitting comprising transmitting data corresponding to the first read command on a first portion of signal lines of the data bus and transmitting data corresponding to the second read command on a second portion of the signal lines of the data bus, the first portion of the signal lines separate from the second portion of the signal lines.

2. The method of claim 1, further comprising, in the memory device:
   receiving a control signal specifying a mode in which the data bus is divided into the respective portions; and
   entering the mode in response to the control signal.

3. The method of claim 1, wherein receiving the plurality of read commands in parallel comprises receiving the plurality of read commands in a first set of one or more clock cycles, the method further comprising, in the memory device:
   in a second set of one or more clock cycles distinct from the first set of one or more clock cycles, receiving a single read command; and
   transmitting data corresponding to the single read command on the data bus.

4. The method of claim 3, further comprising, in the memory device:
   in the first set of one or more clock cycles, receiving a first control signal specifying a first mode in which the data bus is divided into the respective portions; and
   in the second set of one or more clock cycles, receiving a second control signal specifying a second mode in which the data bus is undivided;
   wherein transmitting the data corresponding to the single read command on the data bus comprises transmitting data on all signal lines of the data bus.

5. The method of claim 3, wherein the data corresponding to the single read command is transmitted on a first portion of the data bus, the method further comprising, in the memory device:
   in the second set of one or more clock cycles, receiving a column no-operation command corresponding to a second portion of the data bus; and
   in response to the column no-operation command, transmitting no data on the second portion of the data bus while transmitting the data corresponding to the single read command on the first portion of the data bus.

6. The method of claim 1, wherein:
   the first read command comprises a first plurality of command bits;
   the second read command comprises a second plurality of command bits; and receiving the plurality of read commands in parallel comprises receiving the first plurality of command bits on the first bus and receiving the second plurality of command bits on the second bus.

7. The method of claim 6, wherein:
the first read command further comprises a first plurality of address bits;
the second read command further comprises a second plurality of address bits; and
receiving the plurality of read commands in parallel further comprises:
receiving the first plurality of address bits on the first bus,
receiving a first portion of the second plurality of address bits on the second bus, and
receiving a second portion of the second plurality of address bits on the first bus.

8. The method of claim 6, wherein:
the first read command further comprises a first plurality of address bits;
the second read command further comprises a second plurality of address bits; and
receiving the plurality of read commands in parallel further comprises receiving at least a portion of the first plurality of address bits on the first bus and receiving at least a portion of the second plurality of address bits on the second bus.

9. The method of claim 8, wherein receiving the plurality of read commands in parallel further comprises:
receiving the first plurality of command bits on a rising edge of a clock signal in a clock cycle; and
receiving a first portion of the first plurality of address bits on the rising edge of the clock signal in the clock cycle and a second portion of the first plurality of address bits on a falling edge of the clock signal in the clock cycle.

10. The method of claim 9, wherein receiving the plurality of read commands in parallel further comprises:
receiving the second plurality of command bits on the rising edge of the clock signal in the clock cycle; and
receiving a first portion of the second plurality of address bits on the rising edge of the clock signal in the clock cycle and a second portion of the second plurality of address bits on the falling edge of the clock signal in the clock cycle.

11. The method of claim 6, further comprising, before receiving the first plurality of command bits on the first bus, receiving a row-activation command on the first bus.

12. The method of claim 1, further comprising:
in the memory device:
receiving a plurality of write commands in parallel; and
storing data corresponding to respective write commands of the plurality of write commands at respective memory locations in the memory device.

13. A memory device, comprising:
a data bus comprising a plurality of signal lines;
a first bus; and
a second bus, the first bus separate from the second bus;
input/output (I/O) logic to:
receive a plurality of read commands in parallel, the receiving comprising receiving a first read command on the first bus and receiving a second read command on the second bus; and
transmit data corresponding to respective read commands of the plurality of read commands in parallel on respective portions of the data bus, the transmitting comprising transmitting data corresponding to the first read command on a first portion of the signal lines and transmitting data corresponding to the second read command on a second portion of the signal lines of the data bus, the first portion of the signal lines separate from the second portion of the signal lines.

14. The memory device of claim 13, further comprising:
a plurality of memory banks to store data; and
a plurality of row buffers, each corresponding to a respective memory bank of the plurality of memory banks, to buffer data read from specified rows in the plurality of memory banks;
wherein the I/O logic is coupled to the row buffers to receive the data corresponding to the respective read commands from one or more of the row buffers.

15. The memory device of claim 13, wherein:
the I/O logic is to receive the plurality of read commands in a first set of one or more clock cycles;
the I/O logic is further to receive a single read command in a second set of one or more clock cycles distinct from the first set of one or more clock cycles; and
the I/O logic is to transmit data corresponding to the single read command on the data bus.

16. The memory device of claim 15, wherein:
the I/O logic is to enter a first mode in which the data bus is divided into the respective portions in response to a first control signal, wherein the I/O logic is to transmit the data corresponding to the respective read commands on the respective portions of the data bus in the first mode; and
the I/O logic is to enter a second mode in which the data bus is undivided in response to a second control signal, wherein the I/O logic is to transmit the data corresponding to the single read command on all signal lines of the data bus in the second mode.

17. The memory device of claim 13, wherein:
the memory device further comprises an array of memory locations; and
the I/O logic is further to receive a plurality of write commands in parallel, to receive data corresponding to respective write commands of the plurality of write commands, and to provide the received data for storage at respective memory locations in the array.

18. A non-transitory computer-readable storage medium storing one or more programs configured to be executed by one or more processors, the one or more programs comprising instructions to place a memory controller in a specified mode of a plurality of modes, wherein:
in a first mode of the plurality of modes, the memory controller is to:
provide a first plurality of read commands in parallel to a memory device, the providing comprising providing a first read command on a first bus and providing a second read command on a second bus, the first bus separate from the second bus, and
receive data corresponding to respective read commands of the first plurality of read commands from the memory device in parallel on respective portions of a data bus, the receiving comprising receiving data corresponding to the first read command on a first portion of signal lines of the data bus and receiving data corresponding to the second read command on a second portion of the signal lines of the data bus, the first portion of the signal lines separate from the second portion of the signal lines; and
in a second mode of the plurality of modes, the memory controller is to provide a second plurality of read commands to the memory device in series and to receive data corresponding to a respective read command of the second plurality of read commands on all signal lines of the data bus.

\* \* \* \* \*